US012502680B2

(12) United States Patent
Hofman

(10) Patent No.: US 12,502,680 B2
(45) Date of Patent: Dec. 23, 2025

(54) SHOWERHEAD WITH GEAR ASSEMBLY AND SPINNING NOZZLES

(71) Applicant: ETL, LLC, Sparks, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 372 days.

(21) Appl. No.: 18/115,680

(22) Filed: Feb. 28, 2023

(65) Prior Publication Data

US 2024/0286152 A1 Aug. 29, 2024

(51) Int. Cl.
*B05B 3/04* (2006.01)
*B05B 1/18* (2006.01)

(52) U.S. Cl.
CPC .............. *B05B 3/0417* (2025.08); *B05B 1/18* (2013.01)

(58) Field of Classification Search
CPC ........... B05B 1/04; B05B 1/042; B05B 1/044; B05B 1/18; B05B 1/185; B05B 3/04; B05B 3/0409; B05B 3/0418; B05B 3/0422; B05B 3/0427
See application file for complete search history.

(56) References Cited

U.S. PATENT DOCUMENTS 6,360,967 B1 * 3/2002 Schorn .................. B05B 3/0463 239/240
8,403,240 B2 3/2013 Chen
9,067,222 B2 6/2015 Gransow et al.
9,815,070 B2 11/2017 Lin et al.
9,895,701 B2 2/2018 Tian et al.
9,975,128 B2 * 5/2018 Zhou .......................... B05B 3/04

FOREIGN PATENT DOCUMENTS

AU 2017100143 A4 3/2017
CN 215744178 U 2/2022
CN 114653493 A * 6/2022
CN 115301423 A * 11/2022
KR 20180075816 A 7/2018

* cited by examiner

*Primary Examiner* — Darren W Gorman
(74) *Attorney, Agent, or Firm* — ONE LLP

(57) ABSTRACT

A showerhead assembly is provided which includes a housing having a primary conduit, a front cover with one or more nozzles projecting therefrom, and a gear assembly. The front cover and the housing are affixed so as to form a cavity, wherein the gear assembly is assembled therewithin. The primary conduit is in fluid connection with the gear assembly, which is in fluid connection with the one or more nozzles so as to transport water therethrough. Moreover, a portion of the gear assembly is in toothed engagement with the nozzle(s). In this manner, as water enters the gear assembly, its components rotate and ultimately cause the nozzle(s) to rotate. The nozzles are configured to spray a flat, fan shaped spray of water, and can do so as at the same time as they rotate. As such, the showerhead assembly produces a pinwheel-like, massaging spray pattern. The nozzle can rotate synchronistically.

16 Claims, 6 Drawing Sheets

SHOWERHEAD WITH GEAR ASSEMBLY AND SPINNING NOZZLES

BACKGROUND OF THE INVENTION

The present invention relates to showerheads. More particularly, this invention relates to showerheads having a gear assembly with rotating nozzles.

Spray heads are commercially available in numerous designs and configurations for use in showers, faucets, spas, sprinklers and other personal and industrial systems. Spray heads may be categorized as being either stationary or oscillating and may have fixed or adjustable openings. Stationary spray heads with fixed jets are the simplest constructions consisting essentially of a central conduit connected to one or more spray jets directed to produce a constant pattern. The stationary spray showerheads cause water to flow through the construction to contact essentially the same points on a user's body in a repetitive fashion.

Multifunction showerheads are able to deliver water in many different spray patterns such as a fine spray, a coarse spray, a pulsating spray, or even a flood pattern providing high fluid flow but decreased velocity. Of course, many other spray patterns may also be provided.

Many showerhead assemblies allow users to manipulate spray nozzles into various positions and alignments to assist in the cleaning process. Advantageously, some showerhead assemblies include spray nozzles which can direct water to different locations within a shower stall, allowing water to contact desired locations on a user's body. Recently, showerhead assemblies have included gear mechanisms that allow nozzles to rotate or pivot so as to spray water at varying directions onto the user.

For example, U.S. Pat. No. 8,403,240 describes a showerhead comprising a gear train used to drive the rotational movement of the nozzles. Further, the nozzles in the construction described herein are configured such that they form clusters of spiral waterfall water blooms.

Further, U.S. Pat. No. 9,067,222 discloses a showerhead having a geared mechanism. However, in this construction, the nozzles do not rotate. Rather, the nozzles are configured to tilt inwardly and outwardly as the geared mechanism is rotated. Moreover, U.S. Pat. No. 9,895,701 describes a showerhead having a gear assembly having an impeller which rotates nozzles. However, in this embodiment, the geared impeller causes the nozzles to rotate about the showerhead face's center rather than allowing them to rotate in place.

In the foregoing constructions, the embodiments fail to disclose gear assembly configured to reduce the rotational velocity while increasing the torque of the rotating nozzles. Further, the foregoing embodiments also fail to disclose a reduction gear assembly having a carrier with one or more arms. Utilizing a reduction gear assembly in this manner could reduce the output speed and increase the torque of the rotating nozzles while allowing the nozzles to more effectively and steadily pivot so as improve the spray feel and shower experience for the bather.

Further, none of the above-referenced constructions disclose a showerhead having a reduction gear assembly with rotating nozzles that emit a sheer spray of water.

Thus, it would be desirable to provide a showerhead having a reduction geared assembly that drives rotation of one or more nozzles. Further, it would be desirable to provide a showerhead having a geared assembly with a plate having channels, and a carrier having one or more arms, so as to ultimately control the output speed and torque of the rotating nozzles.

It would also be desirable to provide a showerhead assembly which includes nozzles that simultaneously rotate and disperse a sheer spray of water so as to increase coverage area, and improve spray feel and user experience. In this manner, the showerhead produces a flat-fan-shaped sheer stream of water and creates a pinwheel-like, massaging spray pattern.

SUMMARY OF THE INVENTION

The present invention addresses the aforementioned disadvantages by providing an improved showerhead assembly which includes one or more nozzles configured to rotate and disperse a flat-fan-shaped sheer stream of water so as to create a pinwheel-like, massaging spray pattern. Specifically, the showerhead assembly includes a housing, a gear assembly, and a front cover through which the one or more nozzles project.

Further, the preferred showerhead assembly can be relatively traditional in construction including a showerhead housing connected to a water source. Preferably, a threaded inlet is threadably engaged to a threaded pipe providing the source of water. More preferably, the showerhead housing includes a primary conduit configured to be in fluid connection with the threaded inlet so as to receive water and transport the water to the gear assembly, which is in fluid connection with the one or more nozzles. In this regard, the primary conduit provides water to the one or more nozzles so as to allow water to disperse therefrom. Further, the water provided to the one or more nozzles from the gear assembly drives the rotational movement of the one or more nozzles.

In the preferred embodiment, the housing comprises a cylindrical sidewall and the front cover comprises an extended portion. Specifically, the sidewall and the extended portion are configured such that they extend towards one another and engage. More specifically, the extended portion comprises an outer circumference sized and configured to engage with an inner circumference of the sidewall. In this manner, when the sidewall and the extended portion are affixed to one another, an interior chamber is formed within the housing in which the gear assembly and one or more nozzles are located.

Preferably, the gear assembly include: 1) an inlet cover; (2) a ring gear having internal teeth; (3) an impeller having a spur gear affixed thereto; (4) a carrier comprising a sun gear and one or more planetary gears; and, (6) a shaft extending from the inlet cover to the front cover so as to allow the gear assembly to rotate as water passes through. More preferably, the front cover comprises a groove configured for receipt of a first end of the shaft, and the inlet cover comprises a groove configured for receipt of the second end of the shaft. Even more preferably, the front cover, the shaft, and the inlet cover each share a same central axis. Further, the central axis of the front cover, the shaft, and the inlet cover defines a central axis of the showerhead housing. Preferably, the ring gear, the impeller, the spur gear, and the carrier are each positioned between the first end and the second end of the shaft, and rotate about the shaft.

In the preferred embodiment, the inlet cover is directly adjacent to and in fluid communication with the primary conduit. Preferably, the inlet cover comprises one or more channels configured to allow water to pass through so as to travel through the gear assembly, rotate the nozzles, and disperse therefrom. According to an aspect of the embodiments, the channel(s) each comprise an angled inlet and an outlet. In this way, water from the primary conduit is transported through the angled inlet(s) so as to travel downstream through the gear assembly (i.e., to the impeller) at an angled trajectory (e.g., a clockwise direction), thereby causing rotation of the impeller.

Specifically, the ring gear comprises an inner peripheral wall comprising a ledge portion and the internal teeth. More specifically, the ledge portion is configured for receipt of the inlet cover. Further, the impeller is disposed within the ring gear so as to be directly adjacent to, downstream of, and in fluid connection with the inlet cover. More specifically, the water exiting the one or more channels at an angled trajectory collides with the impeller so as to drive its rotation in a direction corresponding to the direction of the angled trajectory.

In preferred embodiments, the spur gear is operatively coupled with the impeller so as to rotate in response to the impeller rotating. More preferably, the spur gear co-axially extends from the impeller's downstream side so as to extend towards the front cover. Even more preferably, the spur gear and the impeller are positioned along the shaft so as to rotate about the central axis.

Further, the spur gear is directly adjacent to and upstream of the carrier. According to an aspect of the embodiments, the carrier comprises a spindle, an arm, the sun gear, and the planetary gear. In some embodiments, the carrier can comprise more than one arm and one or more planetary gears. According to an aspect of the embodiments, the arm comprises an inner end and an outer end. Preferably, the spindle extends from the carrier's arm's outer end and in a direction towards the inlet cover. More preferably, the planetary gear is operatively coupled to the carrier by the spindle. Even more preferably, the planetary gear is positioned within the ring gear and is in meshed engagement with the internal gear. Additionally, the planetary gear is directly adjacent to and downstream of the impeller. Specifically, the planetary gear is directly adjacent to the spur gear of the impeller, and is in tooth engagement with the spur gear. As such, the planetary gear is configured to rotate in response to the spur gear rotating. In this manner, the planetary gear drives rotation of the arm, as well.

Further, in preferred embodiments, the carrier's sun gear is arranged on the inner end of the arm and extends from the proximal surface towards the direction of the front cover. Preferably, the sun gear is configured to rotate in response to the arm rotating. More preferably, the sun gear is positioned along the carrier so as to share a central axis with the shaft. Further, the sun gear is configured to rotate about the central axis. Moreover, the one or more nozzles are directly adjacent to and downstream of the carrier. Preferably, the one or more nozzles each comprise a toothed outer circumference that extends towards the sun gear so as to be in toothed engagement with the sun gear. In this manner, as the sun gear rotates as a result of the arm rotating, the one or more nozzles are configured to rotate or spin, as well. Preferably, as water reaches the one or more nozzles, the one or more nozzles are configured to simultaneously rotate and spray water.

Moreover, the face of the front cover comprises one or more openings corresponding to the number of nozzles, wherein each of the one or more openings is sized and configured for receipt of at least a portion of a respective nozzle. More preferably each of the one or more nozzles' toothed outer circumference is positioned on the front cover such that it interfaces therewith and overlays on the opening(s). In this regard, as the sun gear and toothed outer circumference mesh together, the nozzles can spin or rotate in place in each respective opening. In preferred embodiments, the sun gear is arranged such that it engages each nozzle's toothed outer circumference. In this way, the nozzles are configured to spin in a synchronous manner.

Further, the one or more nozzles are configured to at least partially protrude outwardly from the face of the front cover so as to disperse a flat, fan-shaped, or sheet-like, sheer spray of water therefrom. In the preferred embodiment, the one or more nozzles includes at least three nozzles. In other preferred embodiments, the one or more nozzles includes four nozzles. Each nozzle includes a nozzle wall having a nozzle inlet, a nozzle outlet, and a tapered chamber. Specifically, the nozzle inlet forms a proximal end of the nozzle wall, and the nozzle outlet forms a distal end of the nozzle wall. More specifically, the nozzle inlet is in fluid connection with the gear assembly so as to receive water therefrom. In this manner, the nozzle inlet can transport water to the tapered chamber, through which it travels and exits out the nozzle outlet so as to disperse in a flat or fan-shaped stream.

In preferred embodiments, the tapered chamber is configured to taper inwardly so as to decrease in cross-sectional area from the distal end towards the proximal end. Further, the nozzle outlet is sufficiently small in diameter so as to create a constricted area in which the water can be expelled from at a high pressure and high velocity. As the water exits the nozzle outlet, it passes through a cavity formed on a front portion of the nozzle. The cavity is configured so as to have a greater height than the nozzle outlet, but a smaller height than the front end of the sheer nozzle. As such, as water passes through the nozzle, it is dispersed such that it sprays narrow in one direction and wide in another. In this way, the nozzle disperses sheer, flat or fan-like streams of water.

Preferably, water is expelled from the one or more nozzle outlets at the same time as the nozzles are spinning. In this fashion, the showerhead assembly produces a spinning sheer spray pattern, wherein the nozzles are rotating as the fan-shaped sheer spray creates a pinwheel-like, massaging spray pattern. According to an aspect of the embodiments, the gear assembly is configured as a reduction gear assembly so as to control the speed and torque of the rotating nozzles. In this manner, the nozzles are configured to rotate in a consistent and steady manner as water is dispersed therefrom, thereby improving the spray feel and user experience.

Additionally, in some embodiments, one or more sealing members or rings, such as O-rings, can be utilized so as to prevent inadvertent water leakage from the showerhead assembly. For example, a sealing ring can be disposed between the front cover and the housing. Additionally or alternatively, a sealing ring can be disposed between each of the nozzles and the front cover.

Thus, it is an object of the present invention to provide a showerhead assembly with one or more nozzles configured to spin. In this way, the showerhead assembly produces a spray that hits a different point on a user's body in a consistent fashion, thereby providing better spray coverage and improved spray pattern feel.

Further, it is an additional object of the present invention to provide a showerhead assembly having one or more nozzles which provide a flat, fan-shaped, or sheet-like stream. In this manner, the showerhead assembly produces a high force, high velocity water experience for the bather. In this manner, the desired showerhead assembly could improve the spray pattern's overall feel and user experience.

Other features and advantages of the present invention will be appreciated by those skilled in the art upon reading the detailed description which follows with reference to the drawings.

BRIEF DESCRIPTION OF THE DRAWINGS

These and other, further and more specific objects and advantages of the invention will be apparent to those skilled in the art form the following detailed description thereof, takin in conjunction with the Drawings, in which.

DETAILED DESCRIPTION OF THE INVENTION

Figure 1:
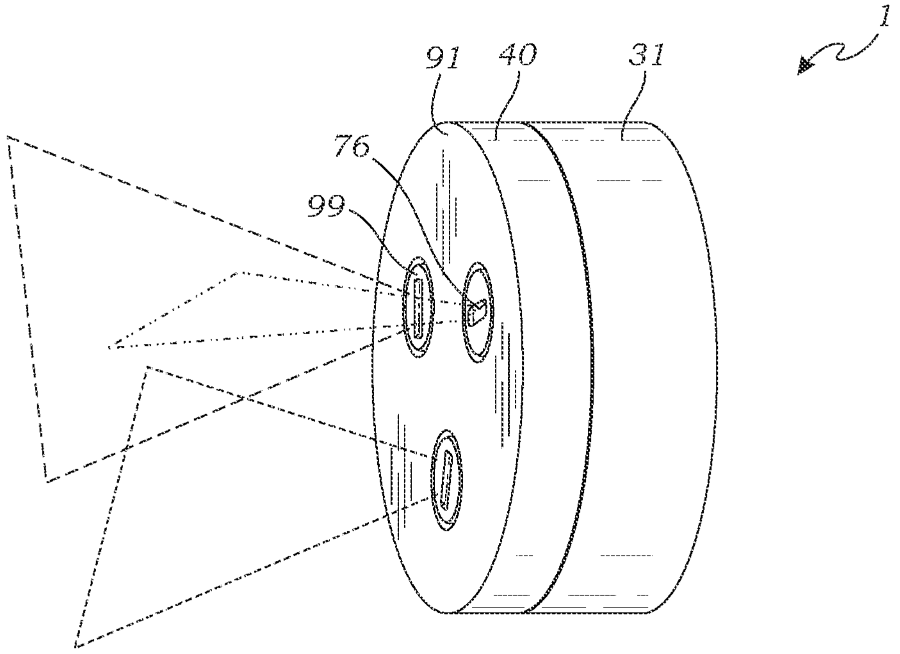
FIG. 1 is a right side partial view depicting an exemplar embodiment of a showerhead assembly having rotating nozzles.
Figure 2:
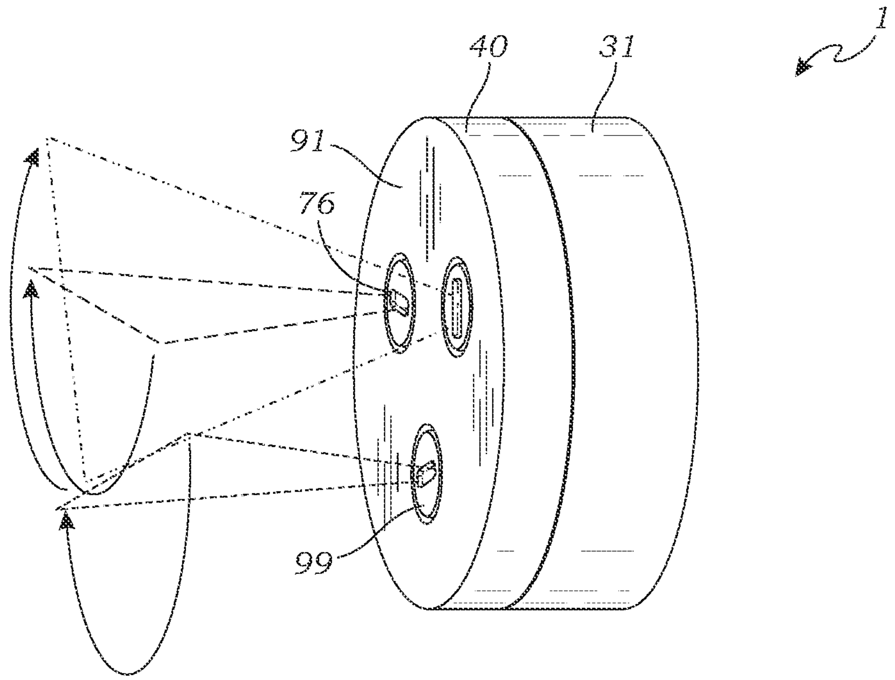
FIG. 2 is a right side partial view depicting the showerhead assembly show in FIG. 1, wherein the nozzles are all rotating in a same direction.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-11, the water spraying assembly of the present invention is illustrated as a showerhead assembly 1 having a housing 20 which includes a gear assembly 30, and a front cover 40 having one or more nozzles 99 projecting therefrom. Like traditional constructions, the preferred showerhead housing 20 is connected to a water source. Preferably, this showerhead housing 20 includes a longitudinally extending tubular primary conduit 5 in fluid connection with a threaded inlet that threadably engages to a threaded pipe providing the source of water. More preferably, and as will be described in further detail below, the primary conduit 5 is in fluid connection with the gear assembly 30, which is in fluid connection with the one or more nozzles 99. In this manner, the primary conduit 5 can provide water to the one or more nozzles 99 which then disperse such water.

In some preferred embodiments, the showerhead assembly 1 is constructed as a stationary showerhead. In alternative embodiments, the showerhead assembly 1 is connected to the water source by a neck portion capable of swiveling. As understood by those skilled in the art, water is capable of flowing through a channel within the neck portion 97, which is fluid connection with the primary conduit 5, so as to transport water to the one or more nozzles 99 on the front cover 40.

In other preferred embodiments (though not illustrated), the showerhead assembly 1 is constructed as a handheld showerhead assembly 1. In these embodiments, the showerhead assembly 1 includes an elongate hollow handle extending longitudinally so as to define a longitudinal axis. Preferably, the front cover 40 on the handheld showerhead assembly 1 is configured to face an angle between 45° and 90° relative to the elongate hollow handle's 99 longitudinal axis. Though not illustrated, like traditional handheld showerheads, the elongate hollow handle can further include a proximal end threadably affixed to a flexible hose so as to allow the user to control and manipulate the orientation of the showerhead. As understood by those skilled in the art, in these embodiments, water is capable of flowing through a channel (not shown) within a center of the elongate hollow handle, which is in fluid connection with the primary conduit 5, so as to transport water to the one or more nozzles 99 configured to spray water therefrom.

Figure 3:
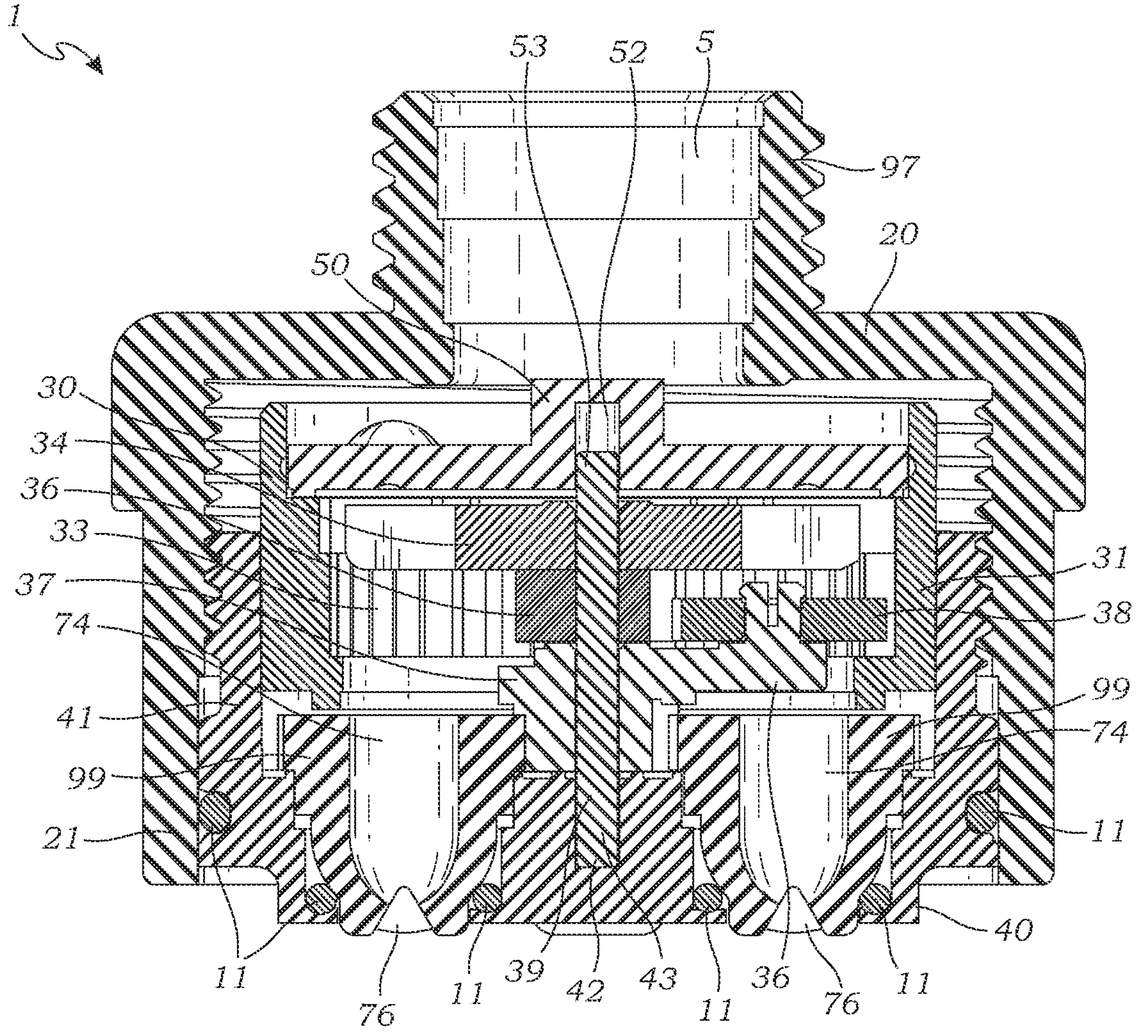
FIG. 3 is a top cutaway view depicting an exemplar embodiment of a showerhead assembly, illustrating the gear assembly disposed within the cavity between the housing and the front cover.
Figure 4:
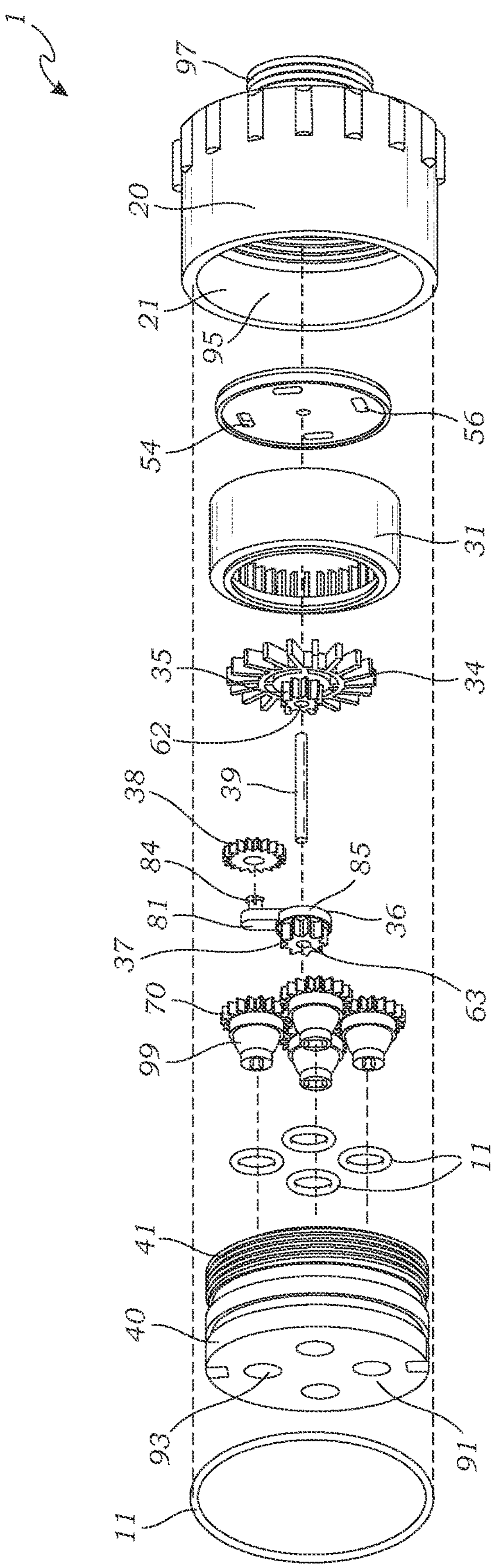
FIGS. 4 and 5 are a front side exploded view and a back side explored view, respectively, of an exemplar embodiment of a showerhead assembly, illustrating the gear assembly and nozzles thereof.
Figure 5:
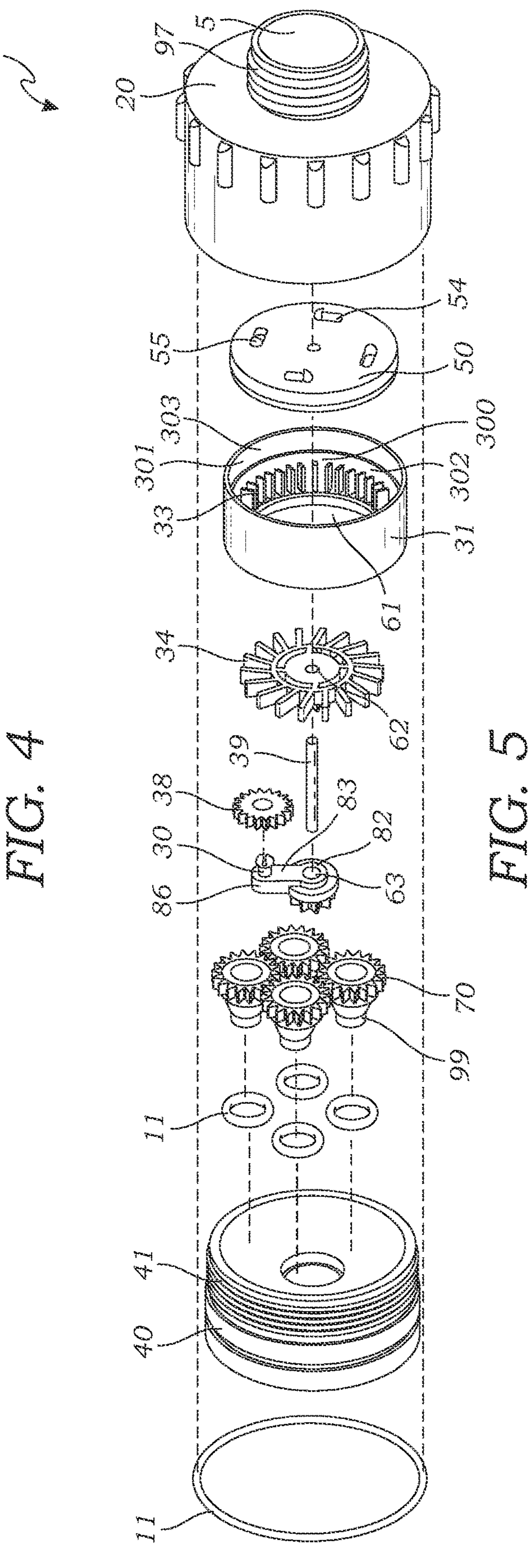
Figure 6:
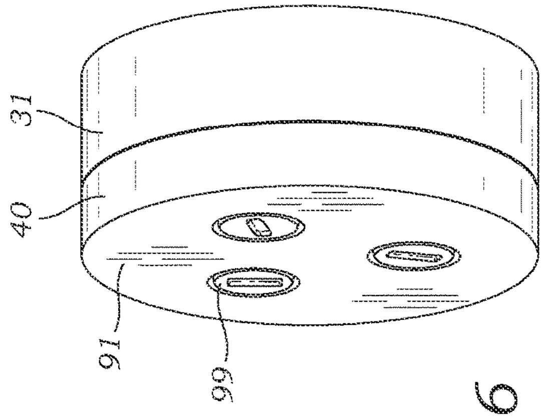
FIG. 6 is a front side partial view illustrating an exemplar embodiment of a showerhead assembly, wherein the front cover is affixed to the ring gear.

In preferred embodiments, and as best shown in FIGS. 3-5, the housing 20 comprises a cylindrical sidewall 21 extending in a distal direction towards the front cover 40. Furthermore, the front cover 40 comprises an extended portion 41 extending in a proximal direction towards the housing 20. Specifically, the extended portion 41 comprises an outer circumference sized and configured to engage with an inner circumference of the housing's sidewall 21. In some embodiments, the inner circumference of the housing's sidewall 21 includes female threads configured to threadably engage with male threads on the outer circumference of the front cover's extended portion 41. In this regard, the front cover 40 can affix to the housing 20, and thereby form a cavity 95 between them. In addition, the one more nozzles 99 and the gear assembly 30 are disposed within the cavity 95.

In other preferred embodiments, and as depicted in FIGS. 1-2, and 6-9, the front cover 40 can affix to a ring gear 31 of the gear assembly 30. Further, the ring gear 31 is configured to receive and house the inlet cover 50. In this regard, the ring gear 31 operatively connects the front cover 40 to the inlet cover 50. The space between the front cover 40 and the inlet cover 50 defines the cavity 95 in which the gear assembly 30 can be disposed within.

In preferred embodiments, and as best shown in FIGS. 3-9, the gear assembly 30 comprises: (1) the inlet cover 50; (2) the ring gear 31 having internal teeth 33; (3) an impeller 34 having a spur gear 35 affixed thereto; (4) a carrier 36 comprising a sun gear 37 and a planetary gear 38; and, (6) a shaft 39 extending from the inlet cover 50 to the front cover 40 so as to allow the gear assembly 30 to rotate as water passes through. Specifically, the front cover 40 and the inlet cover 50 each comprise a groove 42, 52 (respectively), corresponding in size and shape to a portion of the shaft 39. More specifically, the shaft 39 comprises a first end 43 and a second end 53, wherein the front cover's groove 42 is configured to receive the first end 43 and the inlet cover's groove 52 is configured to receive the second end 53. Preferably, the front cover 40 and the inlet cover 50 have a same central axis. More preferably, the grooves 42, 52 are positioned along the central axis. Even more preferably, the shaft 39 is positioned such that its central axis is the same as that of the front cover 40 and inlet cover 50. Additionally, in some embodiments, the central axis of the shaft 39, the front cover 40, and the inlet cover 50 also defines the central axis of the showerhead housing 20. In some embodiments, the front cover 40 and the inlet cover 50 are both circular in shape. Furthermore, in some embodiments, the shaft 39 can be cylindrical in shape. Those of skill in the art will recognize that other shapes and configurations for the front cover 40, inlet cover 50, shaft 39, and/or components related thereto, can be utilized without departing from the scope of the invention.

Further, and as best depicted in FIG. 3, the ring gear 31, the impeller 34, and the carrier 36 are each positioned between the shaft's first end 43 and the second end 53. Specifically, and as best shown in FIGS. 4-5, the shaft 39 is configured to pass through (1) a space 61 within the ring gear 31; (2) a central aperture 62 which extends through the impeller 34 and the spur gear 35; and, (3) an orifice 63 in the carrier 36 as the shaft 39 coaxially extends from the inlet cover 50 to the front cover 40. More specifically, the central aperture 62 and the orifice 63 are positioned such that they lie along the same central axis as the inlet cover 50 and front cover 40. In this regard, the impeller 34, the spur gear 35, and the carrier 36 are configured to rotate about the central axis. In preferred embodiments, the ring gear 31 is configured to be stationary or fixed. Further, in some embodiments, the one or more nozzles 99 are configured such that they circumferentially surround the front cover's groove 42. In this manner, the shaft 39 is arranged along a central point relative to the one or more nozzles 99 of the showerhead assembly 1.

Preferably, and as best shown in FIG. 3, the inlet cover 50 is directly adjacent to and in fluid communication with the primary conduit 5 of the showerhead housing 20. Specifically, the inlet cover 50 comprises one or more channels 54 configured to allow water to pass therethrough from the primary conduit 5. In this manner, water passes through the one or more channels 54 of the inlet cover 50 and is transported downstream through the gear assembly 30 and, ultimately, rotate the nozzles 99 and disperse therefrom.

According to an aspect of the embodiments, the number of channels 54 on the inlet cover 50 may, or may not, correspond to the number of nozzles 99 in the assembly. In preferred embodiments, and as shown in 6-9, the inlet cover 50 comprises three channels 54. Preferably, each of the three channels 54 are equidistant from each neighboring channel 54. Further, in this embodiment, the showerhead assembly 1 can include three nozzles 99. In other preferred embodiments, and as shown in FIGS. 4-5, the inlet cover 50 comprises four channels 54. Preferably, each of the four channels 54 is positioned along a different quadrant of the inlet cover 50 so as to be equidistant from one another. In this embodiment, the showerhead assembly 1 includes four nozzles 99.

In preferred embodiments, and as best depicted in FIGS. 4-5, and 8-9. each channel 54 comprises an angled inlet 55 and an outlet 56. In some embodiments, each inlet 55 is partially obstructed by a cover so as to allow water to enter therein at an angled trajectory. In this manner, the angle inlet(s) 55 receive water from the primary conduit 5 and delivers the water through the outlet 56 so as to be transported downstream through the gear assembly 30 at an angled trajectory. In some embodiments, the angled inlet(s) 55 are configured such that water passing through the channels 54 is transported out the outlet(s) 56 in a clockwise direction. In other embodiments, however, the angled inlets 55 can be configured such that the water is transported out the outlet(s) 56 in a counterclockwise direction.

Preferably, and with particular reference to FIGS. 4-5, the ring gear 31 comprises an inner peripheral wall 300 having a first portion 301 and a second portion 302. According to an aspect of the embodiments, the internal teeth 33 of the ring gear 31 are arranged to project inward along a circumference of the ring gear's second portion 302. In some embodiments, the ring gear 31 includes a ledge portion 303 which circumferentially extends along the inner peripheral wall 300 and is configured to receive the inlet cover 50. Specifically, the ledge portion 303 is configured such that the inlet cover 50 resides within the first portion 301 when seated thereon.

Moreover, and as best shown in FIGS. 3-5, the impeller 34 is housed within the ring gear 31. In preferred embodiments, the impeller 34 is directly adjacent to, downstream of, and in fluid connection with the inlet cover 50 so as to receive water passing from the one or more outlets 56. Specifically, the water passing through the inlet cover 50 at the angled trajectory interfaces or collides with a surface of the impeller 34 so as to drive the impeller 34 into rotation. Preferably, the impeller 34 is configured such that it rotates in a direction corresponding to the angled trajectory of the water passing therethrough. For example, when water passes through the inlet cover's channels 54 in a clockwise direction, the impeller 34 is configured such that it spins the water in a clockwise direction. In other embodiments, when water passes through the inlet cover's channels 54 in a counter-clockwise direction, the impeller 34 is configured such that it spins the water in a counter-clockwise direction.

In preferred embodiments, and with reference to FIGS. 3-5, 7, and 9, the impeller 34 is operatively coupled with the spur gear 35. In this manner, as the impeller 34 rotates, the spur gear 35 rotates, as well. Preferably, the spur gear 35 co-axially extends from a bottom surface of the impeller 34 so as to extend towards the direction of the front cover 40. More preferably, the shaft 39 extends through the central aperture 62 such that the impeller 34 and the spur gear 35 rotate about the central axis. Further, the spur gear 35 is housed within the second portion 302 such that it is in meshed connection with the ring gear's internal teeth 33. More specifically, the spur gear 35 is positioned such that it is directly adjacent to and upstream of the carrier 36.

Moreover, and as shown in FIGS. 4-5, 7, and 9 the carrier 36 has a proximal surface 81 and a distal surface 82. Further, the carrier 36 comprises one or more arms 83, a spindle 84, the sun gear 37, and one or more planetary gears 38. In some preferred embodiments, the carrier 36 comprises a single arm 83 (see, e.g., FIGS. 4-5). In other preferred embodiments, the carrier 36 comprises two or more arms 83 (see, e.g., FIGS. 7 and 9). Specifically, in some embodiments, the carrier comprises one or more arms, wherein each arm is configured to include a planetary gear.

According to an aspect of the embodiments, and with reference to FIGS. 4-5, 7 and 9, the arm(s) 83 includes an inner end 85 and an outer end 86. Preferably the spindle 84 extends from the outer end 86 of the arm 83. More preferably, the spindle 84 extends from the distal surface 82 so as to extend towards the direction of the inlet cover 50. Even more preferably, the planetary gear 38 is coupled to the carrier 36 by the spindle 84. In this manner, the planetary gear 38 interfaces with the distal surface 82 of the carrier 36.

In preferred embodiments, and as best shown in FIG. 3, the planetary gear 38 is positioned within the space 61 of ring gear 31, between the inner peripheral wall 300. Specifically, and as shown in FIGS. 3-5, 7, and 9 the planetary gear 38 is configured along the arm 83 of the carrier 36 so as to be offset relative to the central axis. More specifically, the outer end 86 of the arm 83 is positioned such that the planetary gear 38 positioned thereon rotates offset relative to the central axis. Preferably, the planetary gear 38 is disposed within the second portion 302 and is configured to be in meshed engagement with the internal teeth 33. More preferably, the planetary gear 38 is directly adjacent to and downstream of impeller 34. Even more preferably, the planetary gear 38 is directly adjacent to the spur gear 35 affixed to the impeller 34, and is in toothed engagement with the spur gear 35. As such, as the spur gear 35 rotates in response to the impeller 34 rotating, the planetary gear 38 is configured to rotate, as well, by way of the toothed engagement with the rotating spur gear 35.

Further, and with reference to FIGS. 3-5, 7 and 9, the carrier's sun gear 37 is configured to extend from the proximal surface 81 towards the direction of the front cover 40. Specifically, the sun gear 37 is positioned along the inner end 85 of the arm 83. More specifically, the sun gear 37 is longitudinally aligned with the shaft 39 so as to share a central axis therewith. Further, the sun gear 37 is configured along the carrier 36 so as to rotate about the central axis. Even more specifically, the sun gear 37 is configured such that it rotates in response to the planetary gear 38 rotating, thereby causing the arm 83 to rotate.

Figure 7:
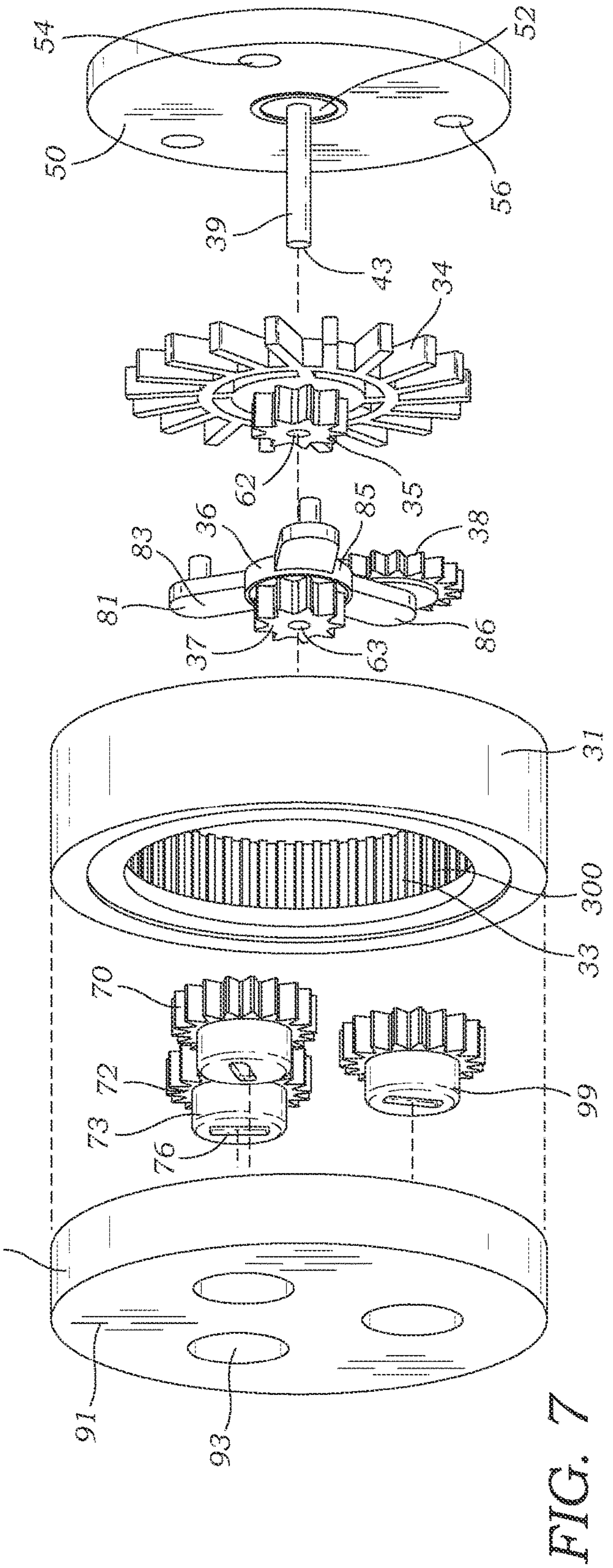
FIG. 7 is a front exploded view of the showerhead assembly depicted in FIG. 6, illustrating the gear assembly and nozzles of the showerhead assembly.
Figure 8:
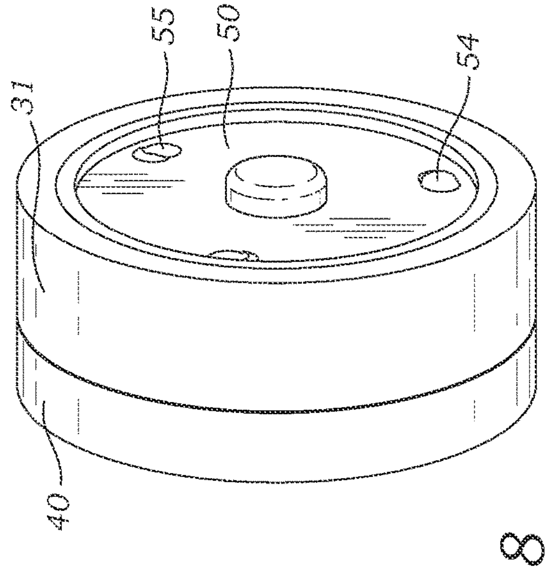
FIG. 8 is a back side partial view of the showerhead assembly depicted in FIG. 6, illustrating the inlet cover disposed within the ring gear.
Figure 9:
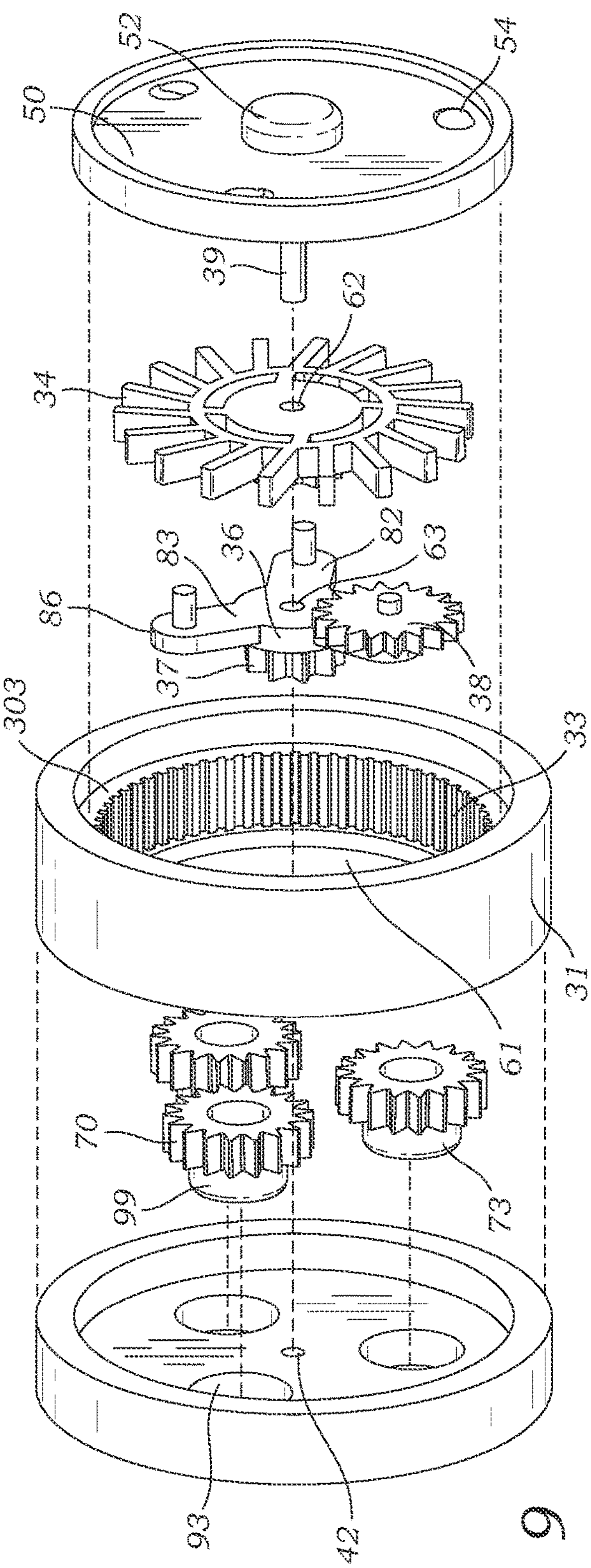
FIG. 9 is a back exploded view of the showerhead assembly depicted in FIG. 8, illustrating the gear assembly and nozzles of the showerhead assembly.

In preferred embodiments, and as best depicted in FIGS. 3-5, 7 and 9, each of the one or more nozzles 99 is directly adjacent to and downstream of the carrier 36. Preferably, the one or more nozzles 99 are in toothed engagement with the sun gear 37. Specifically, and as best shown in FIGS. 5, 7 and 9, each of the one or more nozzles 99 comprises a toothed outer circumference 70 that extends towards and engages with the sun gear 37. In this manner, each of the one or more nozzles 99 is operatively coupled with the gear assembly 30. Thus, as the sun gear 37 rotates, the one or more nozzles 99 are configured to rotate, as well. In this manner, as water reaches the one or more nozzles 99, the one or more nozzles 99 are configured to rotate or spin at the same time as water is spraying therefrom.

Figure 10:
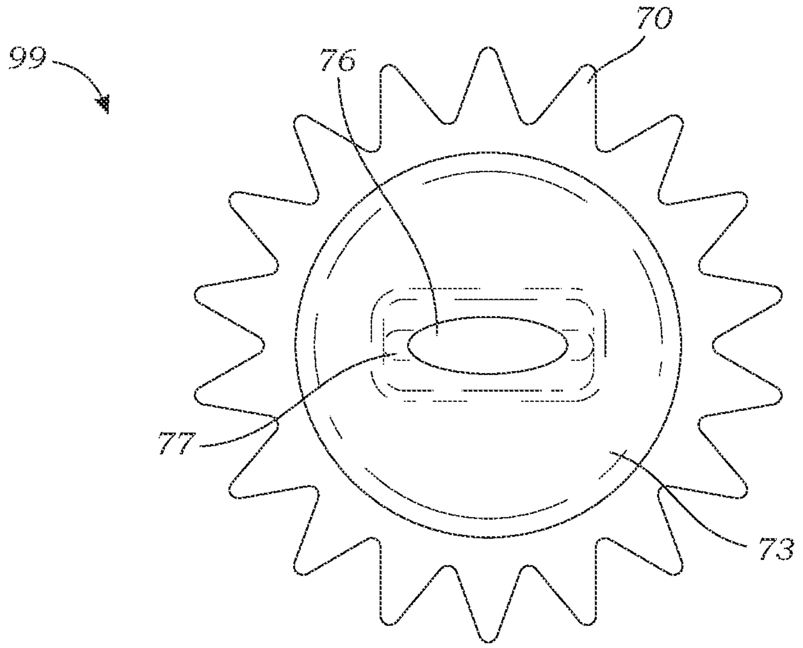
FIG. 10 is a front perspective view depicting a nozzle of the showerhead assemblies described herein.
Figure 11:
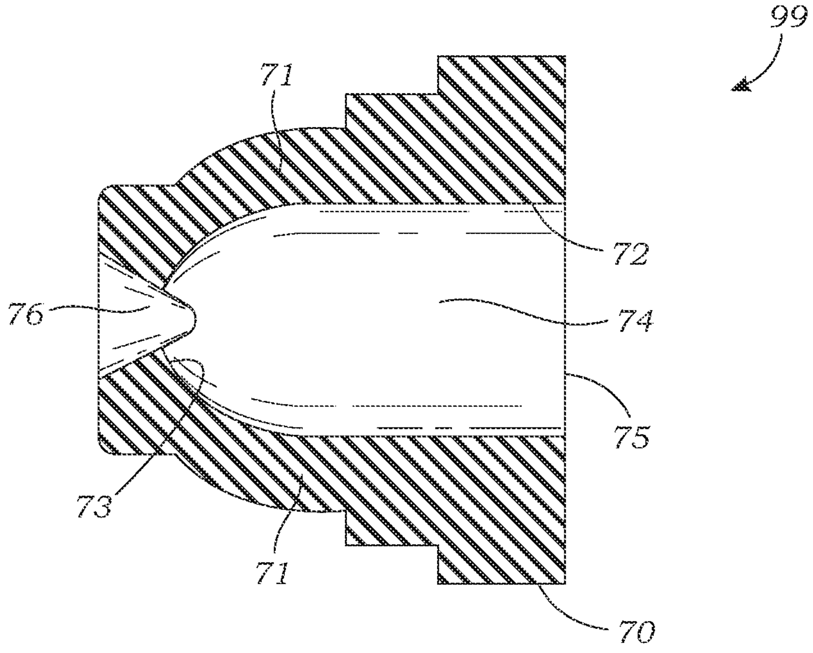
FIG. 11 is a side cutaway view of the nozzle depicted in FIG. 10.

Specifically, in preferred embodiments, and as best illustrated in FIGS. 10-11, each of the one or more nozzles 99 comprises a nozzle wall 71 configured so as to have distal end 72 having a first diameter and a proximal end 73 having a second diameter, wherein the first diameter is greater than the second diameter. More specifically, the toothed outer circumference 70 comprises teeth arranged along the distal end 72. Even more specifically, the face 91 of the front cover 40 comprises one or more openings 93 corresponding to the number of nozzles 99, wherein each of the one or more openings 93 is sized and configured for receipt of a corresponding proximal end 73. In preferred embodiments, the distal end(s) 72 comprising the toothed outer circumference 70 comprises a diameter greater than the diameter of the opening(s) 93. In this manner, the toothed outer circumference 70 of each nozzle 99 is configured to protrude from the openings 93 in a proximal direction towards the sun gear 37. Specifically, each of the one or more nozzles' toothed outer circumference 70 is positioned on the front cover 40 such that it interfaces therewith and overlays on the opening(s) 93. In this manner, as the sun gear 37 and toothed outer circumference 70 mesh together, each nozzle 99 can spin or rotate in place in each corresponding opening 93.

According to an aspect of the embodiments, the gear assembly 30 is a reduction gear assembly 30 operatively coupled with the one or more nozzles 99. In this manner, the set of rotating gears in the gear assembly 30 are configured to slow output speed and increase output torque of each of the one or more nozzles 99. As such, as water reaches the nozzles 99, the nozzles 99 can spin with slower speed, more torque, and in a more consistent manner. For example, the carrier 36 comprises arm(s) 83 configured to reduce the rotating speed of the one or more nozzles 99. Further, the number of channels 54 arranged on the inlet cover 50 can be varied so as to control the water flow's input speed and torque, thereby ultimately controlling the desired output speed and torque of the spinning nozzles 99. Those of skill in the art will recognize that the number of gears in the gear assembly 30, and the configuration and arrangement thereof, can be changed to produce a desired rotational movement of the nozzle(s) 99 without departing from the scope of the invention.

According to another aspect of the embodiments, and as shown in in FIGS. 3-5, 7 and 9, the sun gear 37 can be positioned so as to interface with each nozzle 99 in a uniform or symmetric manner. In preferred embodiments, the sun gear 37 is in toothed engagement with each nozzle's toothed outer circumference 70 in a uniform manner so as to cause each nozzle 99 to spin or rotate synchronistically with one another. Further, each nozzle 99 can rotate in a same direction as one another. Those of skill in the art will recognize that the orientation of the nozzle(s) 99 and/or sun gear 37 can be such that the nozzle(s) 99 interface with the sun gear 37 in an asymmetric or non-uniform manner. As such, the sun gear 37 can be in toothed engagement with each nozzle 99 in an asymmetric manner such that the nozzles 99 rotate asychronistically.

Moreover, and with reference to FIGS. 1-7, and 9, the one or more openings 93 on the face 91 of the front cover 40 are configured to receive at least a portion of the one or more nozzles 99, thereby allowing them to partially protrude or extend outwardly therefrom. In some preferred embodiments, the one or more nozzles 99 include one nozzle 99. In other preferred embodiments, the one or more nozzles 99 include at least three nozzles 99 (see, e.g., FIGS. 1-2, AND 6-9). In some embodiments, the one or more nozzles include four nozzles 99 (see, e.g., FIGS. 4-5). Those of skill in the art will recognize that various other nozzle 99 numbers and configurations can be utilized without departing from the scope of the invention.

Preferably, each nozzle 99 of the one or more nozzles 99 is configured to disperse water in a flat, fan-shaped, or sheet-like manner. Further, and with reference to FIGS. 10-11, each nozzle's nozzle wall 71 includes a tapered chamber 74 configured to transport water. More specifically, the tapered chamber 74 is configured to extend from the nozzle wall's proximal end 73 to the nozzle wall's distal end 72. Even more specifically, the tapered chamber 74 comprises a nozzle inlet 75 formed on the distal end 72, wherein the nozzle inlet 75 is in fluid connection with the gear assembly 30 so as to receive water therefrom. Furthermore, the tapered chamber 74 comprises a nozzle outlet 76 formed on the proximal end 73 of the nozzle wall 71. In this manner, the nozzle inlet 75 receives water from the gear assembly 30 so as to allow such water to pass through the tapered chamber 74 and, ultimately, disperse through the nozzle outlet 76.

In preferred embodiments, and still with reference to FIGS. 10-11, the tapered chamber 74 is configured to taper inwardly, or towards the proximal end 73, so as to decrease in cross-sectional area from the distal end 72 towards the proximal end 73. As such, as water travels downstream from the nozzle inlet 75 to the nozzle outlet 76, the velocity of the water stream increases as the water pressure decreases, consistent with principle's of the Bernoulli Effect. Specifically, given the reduction in fluid pressure that results as water flows through a narrowing cavity, the inwardly tapered shape of the tapered chamber 74 increases the velocity of the water stream traveling through its structure. The tapered chamber 74 may have various shapes providing the aforementioned capabilities, and as can be determined by one skilled in the art. For example, the tapered chamber 74 can be cone-shaped or frusto-conically shaped. However, the preferred tapered chamber 74 has a semi-ellipsoid shape, as best illustrated in the FIG. 11.

In preferred embodiments, and still with reference to FIGS. 10-11, the nozzle outlet 76 is sufficiently small in diameter so as to create a constricted area in which the water can be expelled from at a high pressure and high velocity. The nozzle outlet's 76 diameter represents the tapered chamber's 74 smallest cross-sectional diameter. In still a more preferred embodiment, a front portion of the nozzle 99 includes a nozzle cavity 77 which is directly adjacent to and extends from the nozzle outlet 76. Specifically, the nozzle cavity 77 is configured so as to have a wider diameter than the diameter of the nozzle outlet 76. More specifically, the nozzle cavity 77 is configured so as to have a greater height than the height of the nozzle outlet 76, but a smaller height than the height of the front end of the nozzle 99. In this manner, as water exits the nozzle outlet 76 and passes through the nozzle cavity 77, it is dispersed so as to form a stream of water narrow in one direction and wide in another. Specifically, in this way, water is dispersed from each nozzle 99 in a forceful, flat, fan-shaped, or sheet-like stream. The nozzle cavity 77 may have various shapes and diameters providing the aforementioned capabilities, as can be determined by one skilled in the art. For example, the nozzle cavity 77 can be rounded rectangular, oval, or racetrack shaped. In the preferred embodiment, the nozzle cavity 77 has an oblong or ellipsoid perimeter, as best shown in FIG. 10.

In preferred embodiments, the nozzle(s) 99 are spinning (see, e . . . g, FIGS. 1-2) in response to the gear assembly 30 being in toothed engagement with the toothed outer circumference(s) 70 so as to drive the nozzle's 99 rotational movement. Preferably, at the same time as the nozzle(s) 99 are rotating, the nozzle(s) 99 are configured to disperse water from the one or more nozzle outlets 76. In this fashion, the showerhead assembly 1 produces a spinning sheer spray pattern, wherein the nozzles 99 are rotating as the fan-shaped sheer spray creates a pinwheel-like, massaging spray pattern.

According to an aspect of the embodiments, and as shown in FIGS. 3-5, the showerhead assembly 1 can also comprise one or more sealing members 11, sealing rings, or mechanical gaskets, such as an O-ring 11. Specifically, one or more sealing members 11 can be disposed between the front cover 40 and the one or more nozzles 99. More specifically, a sealing member 11 can be disposed between each nozzle 99 and the front cover 40. In this manner, the sealing member (e.g., O-ring) 11 mitigates or prevents water leaking from the showerhead assembly 1. Further, a sealing member 11 can be disposed between the front cover 40 and the housing 20. Specifically, the sealing member 11 can be disposed on an exterior circumference of the front cover 40. In some embodiments, the sealing member 11 can be disposed on the outer circumference of the extended portion 41. Further, the sealing member 11 can be configured such that it sits between the front cover 40 and the inner circumference of the sidewall 21 of the housing 20 so as to prevent or mitigate water leakage from the showerhead assembly 1. In some preferred embodiments, the showerhead assembly 1 comprises the one or more sealing members 11 between each nozzle 99 and the front cover 40, and a sealing member 11 between the front cover 40 and the housing 20.

Accordingly, it is not intended that the invention be limited except by the following claims.

Having described my invention in such terms to enable a person skilled in the art to understand the invention, recreate the invention, and practice it, and having identified the presently preferred embodiments thereof, I claim:

1. A showerhead assembly comprising:

an inlet;

a showerhead comprising a housing, a front cover, a gear assembly, and a neck portion with a primary conduit in fluid connection with said inlet;

one or more nozzles configured to project through said front cover, wherein each of said one or more nozzles is further configured to spray a stream of water that disperses narrow in one direction and wide in another so as to provide a fan-shaped stream of water, and wherein each of said one or more nozzles comprises a nozzle wall having a toothed outer circumference; and said gear assembly comprising an inlet cover and a ring gear having internal teeth, an impeller having a spur gear coaxially affixed thereto, a carrier, and a shaft extending from said inlet cover to said front cover and configured to allow said gear assembly to rotate as water passes therethrough, wherein said shaft defines a central axis for said showerhead;

wherein said inlet cover is in fluid communication with said primary conduit and comprises one or more channels configured to receive water from said primary conduit and transport said water to said impeller;

wherein said impeller is disposed within said ring gear, wherein said impeller is configured to rotate about said central axis, wherein said impeller is further configured to rotate in response to said water interfacing therewith, wherein said spur gear is configured to rotate about said central axis in response to said impeller rotating;

wherein said carrier is directly adjacent to and downstream of said impeller, wherein said carrier comprises an arm having a planetary gear and a sun gear, wherein said planetary gear is in meshed engagement with said ring gear's internal teeth and toothed engagement with said spur gear, wherein said planetary gear is configured to rotate in response to said spur gear rotating, wherein said arm is configured to rotate in response to said planetary gear rotating, wherein said sun gear is configured to rotate in response to said arm rotating, wherein said sun gear is in toothed engagement with said toothed outer circumference of each of said one or more nozzles, wherein rotation of said sun gear is configured to rotate each of said one or more nozzles, and wherein said one or more nozzles are configured to rotate at a same time as water is dispersing therefrom.

2. The showerhead assembly of claim 1, wherein said front cover comprises a first groove sized and configured for receipt of a first end of said shaft, and wherein said inlet cover comprises a second groove sized and configured for receipt of a second end of said shaft, and wherein said front cover, said shaft, and said inlet cover lie along said central axis.

3. The showerhead assembly of claim 1, wherein said impeller, said spur gear, and said sun gear are configured to rotate about said central axis and are operatively coupled with said shaft.

4. The showerhead assembly of claim 1, wherein said arm includes an inner end and an outer end, wherein said planetary gear is positioned along said outer end and said sun gear is positioned along said inner end, and wherein said planetary gear is positioned offset relative to said central axis.

5. The showerhead assembly of claim 1, wherein said sun gear is configured to uniformly be in toothed engagement with each of said one or more nozzles, wherein each of said one or more nozzles is configured to rotate in a synchronous manner.

6. The showerhead assembly of claim 1, wherein said one or more nozzles comprise at least three nozzles.

7. The showerhead assembly of claim 1, further comprising a sealing member disposed between said front cover and said housing.

8. The showerhead assembly of claim 1, wherein a sealing member is disposed between each of said one or more nozzles and said front cover.

9. The showerhead assembly of claim 1, wherein each of said one or more channels comprise an angled inlet and an outlet, wherein said angled inlet receives water from said primary conduit and delivers said water out through said outlet, wherein said water is configured to transport downstream to said impeller at an angled trajectory.

10. The showerhead assembly of claim 9, wherein said angled trajectory of said water is configured to drive rotation of said impeller in a direction corresponding to direction of said angled trajectory.

11. The showerhead assembly of claim 1, wherein said ring gear comprises an inner peripheral wall having a first portion and a second portion, wherein said internal teeth are arranged along said second portion.

12. The showerhead assembly of claim 11, wherein the ring gear comprise a ledge portion circumferentially extending along said inner peripheral wall and configured to receive said inlet cover, wherein said inlet cover is disposed within said first portion.

13. The showerhead assembly of claim 1, wherein said gear assembly is configured as a reduction gear assembly, wherein said reduction gear assembly is operatively coupled with said one or more nozzles, and wherein said reduction gear assembly is configured to slow an output rotational speed and increase an output torque of each of said one or more nozzles as they rotate.

14. The showerhead assembly of claim 1, wherein said one or more nozzles are configured to protrude outwardly from one or more openings in a face of said front cover, wherein said toothed outer circumference of each of said one or more nozzles is configured to overlay each of said one or more openings, wherein said one or more nozzles are configured to rotate in place in each corresponding said one or more openings.

15. The showerhead assembly of claim 1, wherein said carrier includes two additional arms, wherein each of said two additional arms includes an additional planetary gear.

16. The showerhead assembly of claim 1, wherein said housing comprises a sidewall and said front cover comprises an extended portion, wherein said sidewall and said extended portion are configured to engage and form a cavity therebetween, wherein said gear assembly is disposed within said cavity.

* * * * *